US006042007A

United States Patent [19]

Nugent, Jr. et al.

[11] Patent Number: 6,042,007

[45] Date of Patent: Mar. 28, 2000

[54] SELF-SERVICE COMPUTER ASSEMBLY WITH INTEGRATED RECEIPT PRINTER

[75] Inventors: Paul F. Nugent, Jr., Alpharetta; Charles K. Wike, Jr., Sugar Hill; Edward G. Rantze, Lawrenceville, all of Ga.

[73] Assignee: NCR Corporation, Dayton, Ohio

[21] Appl. No.: 09/174,138

[22] Filed: Oct. 16, 1998

[51] Int. Cl.[7] .......... G06K 15/00

[52] U.S. Cl. .......... 235/383

[58] Field of Search .......... 235/380, 383, 235/379, 385, 381; 705/44, 43, 42; 902/22

[56] References Cited

U.S. PATENT DOCUMENTS

| | | | |
|---|---|---|---|
| 5,721,420 | 2/1998 | May | 235/379 |
| 5,736,721 | 4/1998 | Swartz | 235/383 |
| 5,740,744 | 4/1998 | Nashirozawa et al. | 109/24.001 |
| 5,747,784 | 5/1998 | Walter et al. | 235/383 |
| 5,756,978 | 5/1998 | Soltesz et al. | 235/380 |
| 5,780,825 | 7/1998 | Sato et al. | 235/379 |
| 5,821,512 | 10/1998 | O'Hagan et al. | 235/383 |
| 5,837,991 | 11/1998 | LaManna et al. | 235/475 |
| 5,901,204 | 5/1999 | Gallacher et al. | 379/90.01 |
| 5,917,421 | 6/1999 | Saunders | 340/825.34 |
| 5,950,173 | 9/1999 | Perkowski | 705/26 |
| 5,967,264 | 10/1999 | Lutz et al. | 186/61 |
| 5,978,772 | 11/1999 | Mold | 705/16 |
| 5,984,177 | 11/1999 | Do et al. | 235/379 |

*Primary Examiner*—Thien M. Le
*Attorney, Agent, or Firm*—Paul W. Martin

[57] ABSTRACT

A self-service computer system which is sturdy and has a small footprint in a transaction establishment. The system includes a first module including a computer, a bar code reader coupled to the computer for reading bar codes on item purchased by a customer, a card reader coupled to the computer for reading a customer payment card, and a mount for the computer, bar code reader, and card reader; a second module below the first module including a receipt printer coupled to the computer for printing a customer receipt and a housing for the receipt printer; and a third module below the second module including a pedestal for supporting the first and second modules on a horizontal surface.

6 Claims, 5 Drawing Sheets

SELF-SERVICE COMPUTER ASSEMBLY WITH INTEGRATED RECEIPT PRINTER

CROSS-REFERENCE TO RELATED APPLICATIONS

The present application is related to the following pending applications filed by the assignee of the present invention:

Ser. No. 09/070,501, filed Apr. 30, 1998 for APPARATUS AND METHOD OF OPERATING A RETAIL TERMINAL HAVING A SINGLE-ORIENTATION BASE ASSEMBLY AND A MULTIPLE-ORIENTATION BASE ASSEMBLY;

Ser. No. 09/070,620, filed Apr. 30, 1998 for RETAIL TERMINAL HAVING A TILT MECHANISM WHICH INCLUDES A RATCHET MEMBER FOR POSITIONING A DISPLAY MONITOR RELATIVE TO A STATIONARY BASE;

Design Ser. No. 29/090,611 filed Jul. 13, 1998 for a COMPUTER; and

Design Ser. No. 29/090,610 filed Jul. 13, 1998 for a COMPUTER.

BACKGROUND OF THE INVENTION

The present invention relates to computer systems, and more specifically to a self-service computer assembly with integrated receipt printer.

Self-service computers must be able to withstand damage from collisions with moving objects and rough handling. Providing resistance to damage is especially difficult as self-service computer footprints become smaller and self-service computer assemblies become more modular.

Therefore, it would be desirable to provide a small footprint self-service computer assembly which is modular in nature, and which includes a printer assembly which is not easily damaged.

SUMMARY OF THE INVENTION

In accordance with the teachings of the present invention, a self-service computer assembly with integrated receipt printer is provided.

The system includes a first module including a computer, a bar code reader coupled to the computer for reading bar codes on item purchased by a customer, a card reader coupled to the computer for reading a customer payment card, and a mount for the computer, bar code reader, and card reader; a second module below the first module including a receipt printer coupled to the computer for printing a customer receipt and a housing for the receipt printer; and a third module below the second module including a pedestal for supporting the first and second modules on a horizontal surface.

The self-service computer system also includes an advantageous cable arrangement in which a first power cable provides electrical power to the computer including a connector of a first type; a second power cable provides electrical power to the receipt printer including a connector of the first type; a third power cable includes a first connector of the first type and a second connector of a second type suitable for connection to an electrical power source in a country which uses the second type of connector as a standard electrical connector; and a power connector couples the first type of connectors of the first, second, and third power cables together.

It is accordingly an object of the present invention to provide a self-service computer assembly with integrated receipt printer.

It is another object of the present invention to provide a self-service computer assembly with integrated receipt printer which can be placed on a pedestal or mounted to a wall.

It is another object of the present invention to provide a self-service computer assembly which is modular in nature, and in which the receipt printer is a module.

It is another object of the present invention to provide a self-service computer assembly with integrated receipt printer which has a small footprint but which is sturdy and resistant to damage.

It is another object of the present invention to provide a self-service computer assembly with integrated receipt printer which includes a secure power cable assembly having two universal power cables coupled to a single country-specific power cable for powering both computer and printer.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunctio n with the accompanying drawings, in which:

DETAILED DESCRIPTION OF THE PREFERRED EMBODIMENT

Figure 1:
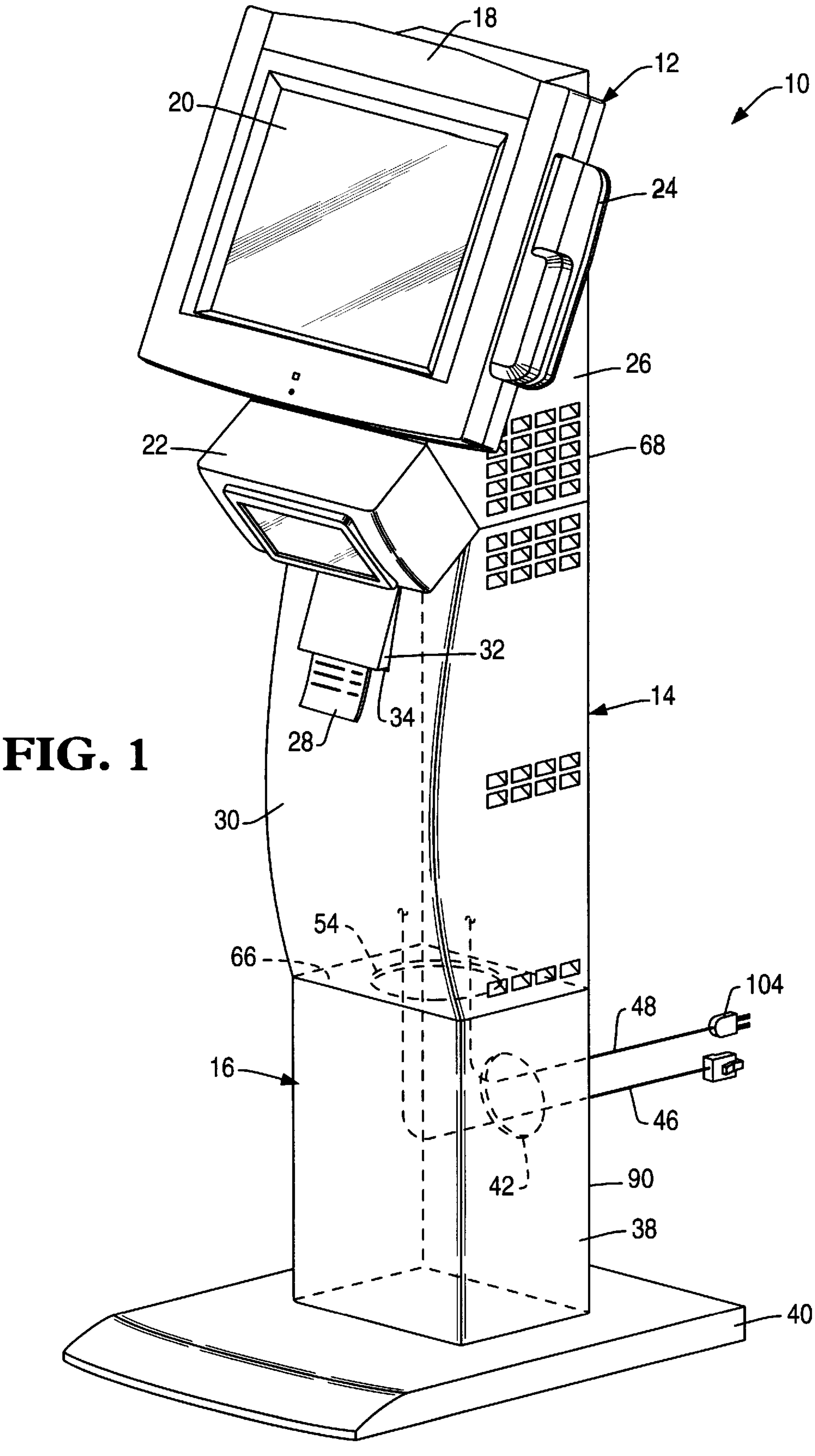
FIG. 1 is a perspective view of a first embodiment of the self-service computer assembly.

Turning now to FIG. 1, self-service computer assembly 10 primarily includes self-service computer module 12 and receipt printer module 14, and may additionally include pedestal module 16.

Self-service computer module 12 includes computer 18, display 20, bar code reader 22, card reader 24, and pedestal mount 26.

Computer 18 as shown is a module 7401 manufactured by the assignee of the present invention; however, the present invention envisions other computers as well. Computer 18 is preferably part of a network in a transaction establishment.

Display 20 is part of computer 18 and preferably includes a liquid crystal display and touch screen.

Bar code reader 22 reads bar codes on items to be purchased. Bar code reader 22 electrically couples to computer 18 in a well-known manner.

Card reader 24 reads payment cards. Card reader 24 may be a magnetic stripe reader, smart card reader, or combination of both. Card reader 24 physically couples to computer 18 and electrically couples to computer 18 in a well-known manner. Card reader 24 may also be physically separate and mounted in other suitable locations on pedestal mount 26, including bar code reader 22.

Pedestal mount 26 provides a structure for combining computer 18, display 20, bar code reader 22, and card reader 26. As shown, pedestal mount 26 includes a upwardly inclined front side for mounting computer 18 at a comfortable viewing and operating angle. Pedestal mount 26 includes a downwardly inclined front side below the upwardly inclined front side for mounting bar code reader 22. Electrical power cable 44, network cable 46, and printer data cable 80 extend through aperture 86 (FIGS. 5) in bottom wall 88 of pedestal mount 26.

Receipt printer module 14 is electrically coupled to computer 18 in a well-known manner using printer data cable 80, which may be a parallel cable. Receipt printer module 14 provides transaction receipt 28 to a customer. Receipt printer module 14 is mounted below and adjacent self-service computer module 12 and includes service door 30 for gaining access to printer assembly 36 (FIG. 3) inside. Service door 30 includes receipt guide 32 for guiding receipt 32 through aperture 34. Cables 46 and 48 pass through aperture 54 in bottom wall 66.

Pedestal module 16 mounts below and adjacent receipt printer module 14 and includes pedestal portion 38 and base portion 40.

Pedestal portion 38 adds enough height to self-service computer assembly 10 to accommodate operators of average height. Pedestal portion 38 includes rear aperture 42 in rear wall 90 for network cable 46 and country-specific power cable 48. Damage to cables 46 and 48 may be further minimized by locating self-service computer assembly 10 adjacent to electrical and network outlets.

Base portion 40 is relatively flat and has a large enough footprint to minimize tipping of self-service computer 18.

Together, pedestal mount 26, receipt printer module 14, and pedestal module 16 form a generally rectangular column.

Figure 2:
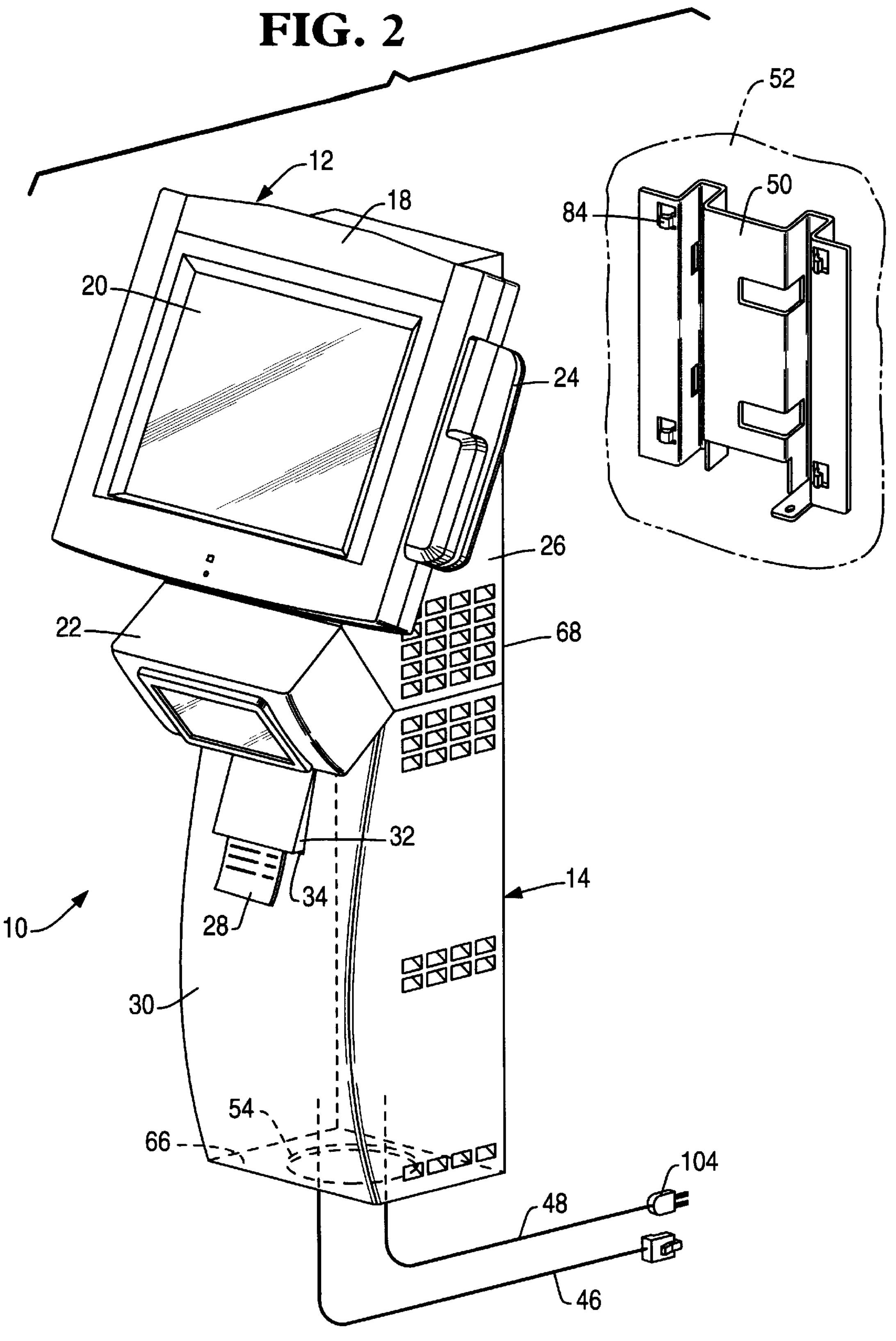
FIG. 2 is a perspective view of a second embodiment of the self-service computer assembly.

Referring now to FIG. 2, a second embodiment of self-service computer assembly 10 is mounts to bracket 50 on vertical support surface 52. Bracket 50 includes hooks 84 which engage corresponding mounting apertures in back wall 68 of pedestal mount 26. Vertical support surface 52 may be a wall or column.

The second embodiment does not include pedestal module 16. Thus, this arrangement may be more secure than the locating self-service computer assembly 10 on a floor.

Cables 46 and 48 pass through bottom aperture 54 in bottom wall 66 of receipt printer module 16. As in the first embodiment, damage to cables 46 and 48 may be further minimized by locating self-service computer assembly 10 adjacent to electrical and network outlets.

Figure 3:
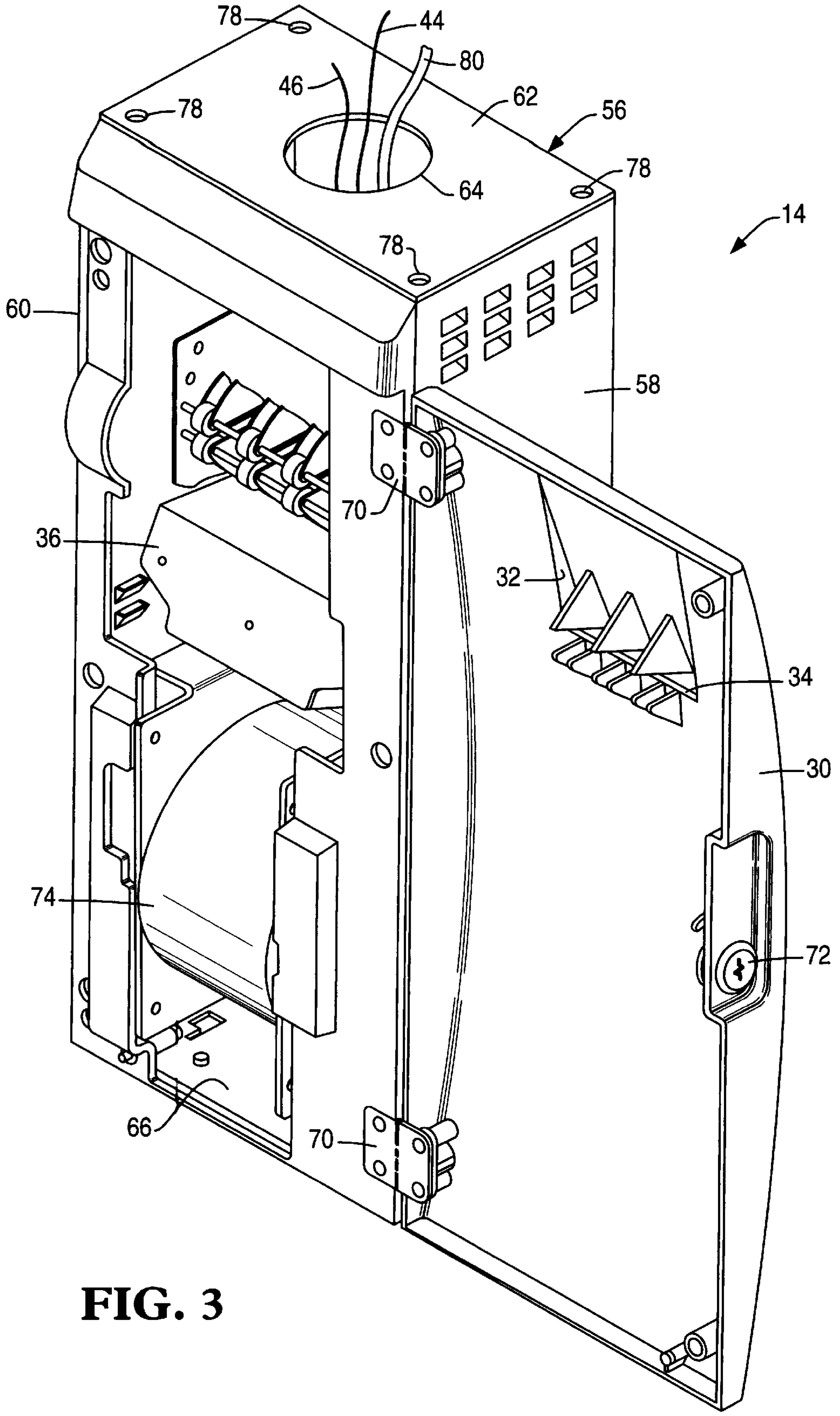
FIG. 3 is a perspective view of a receipt printer module in the self-service computer assembly.
Figure 4:
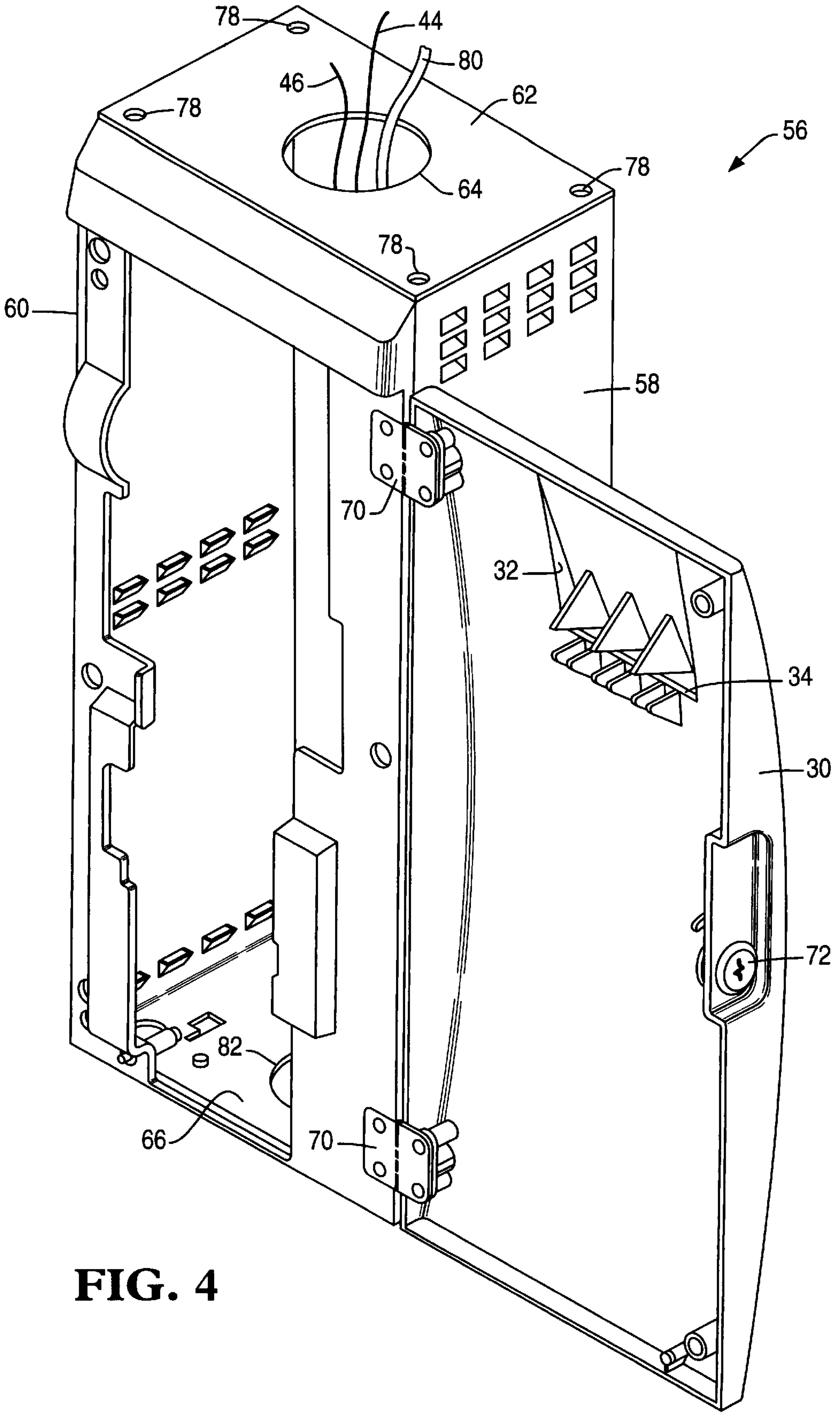
FIG. 4 is a perspective view of the housing of the receipt printer module.

Turning now to FIGS. 3 and 4, receipt printer module 14 is shown in more detail. Printer assembly 36 is a model K580 printer assembly manufactured by Axiohm Transaction Solutions, Inc.; however, the present invention envisions other suitable receipt printers.

Housing 56 is generally box-like in shape, with service door 30 forming a front wall. Service door 30 curves outwardly to accommodate the size of a new receipt paper roll 74. Hinges 70 couple service door 30 to side wall 58. Lock assembly 72 latches to side wall 60 to secure service door 30.

Top wall 62 includes mounting holes 78 for securing receipt printer module 14 to pedestal mount 26 using appropriate fasteners, such as bolts. Top wall 62 additionally includes aperture 64 which is adjacent aperture 86 (FIG. 5) in pedestal mount 26. Parallel data cable 80 between computer 18 and printer assembly 36, as well as cables 44 and 46 from computer 18, pass through apertures 86 and 88. Bottom wall 66 includes aperture 54 (FIG. 4) through which cables 46 and 48 pass.

Figure 5:
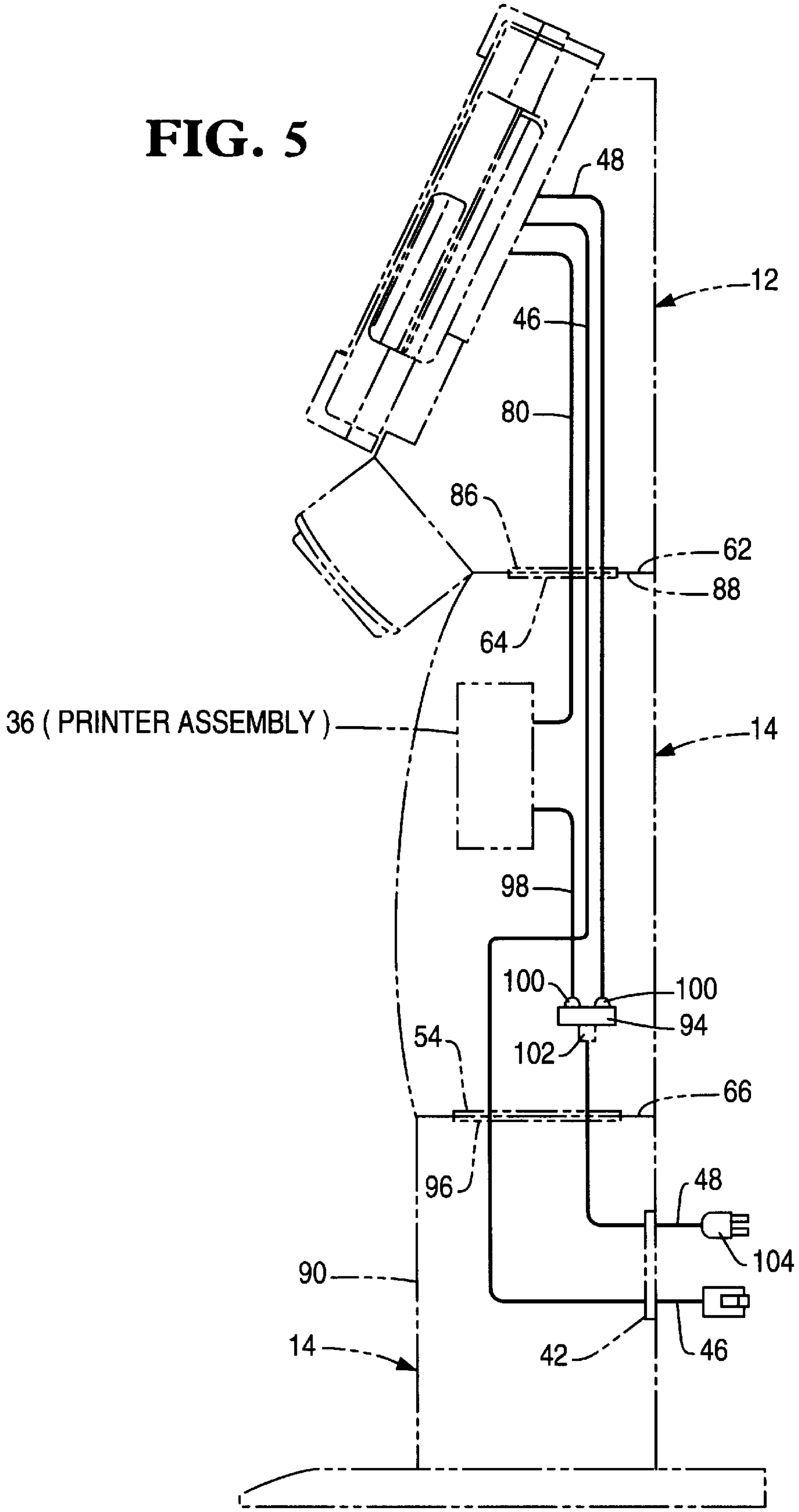
FIG. 5 is a diagram illustrating a cable arrangement within the self-service computer.

Turning now to FIG. 5, the routing arrangement for cables 44, 46, 48, and 80 for the embodiment of FIG. 1 is illustrated in detail.

Network cable 46 passes from computer 18 through apertures 82, 84, 54, 96, and 42.

Printer data cable 80 passes from printer assembly 36 through apertures 88 and 82 to computer 18.

Computer power cable 44 passes from computer 18 through apertures 82 and 88 to power connector 94.

Printer power cable 98 couples to connector 94.

Country-specific power cable 48 passes through apertures 54, 96, and 42.

Power cables 44 and 98 include a single country type of connector 100. All country-specific power cables 48 include the same type of connector 102, which is preferably in use in the same country as connector 100. Only connector 104 varies by country.

Advantageously, use of power connector 94 allows a single power cable 48 to supply power to self-service computer assembly 10. Additionally, when self-service computer assembly 10 is deployed in different countries having different types of power connectors, only a single cable for use in each country must be provided Although the present invention has been described with particular reference to certain preferred embodiments thereof, variations and modifications of the present invention can be effected within the spirit and scope of the following claims.

We claim:

1. A self-service computer system comprising:

a first module including a computer, a bar code reader coupled to the computer for reading bar codes on item purchased by a customer, a card reader coupled to the computer for reading a customer payment card, and a mount for the computer, bar code reader, and card reader;

a second module below the first module including a receipt printer coupled to the computer for printing a customer receipt and a housing for the receipt printer; and a third module below the second module including a pedestal for supporting the first and second modules on a horizontal surface.

2. The self-service computer system as recited in claim 1, further comprising:

a first power cable which provides electrical power to the computer including a connector of a first type;

a second power cable which provides electrical power to the receipt printer including a connector of the first type;

a third power cable which includes a first connector of the first type and a second connector of a second type suitable for connection to an electrical power source in a country which uses the second type of connector as a standard electrical connector; and a power connector which couples the first type of connectors of the first, second, and third power cables together.

3. The self-service computer system as recited in claim 1, wherein the power connector is located in the second module.

4. The self-service computer system as recited in claim 1, wherein the third power cable emanates through an aperture in the third module.

5. The self-service computer system as recited in claim 1, wherein the first, second, and third modules together have a columnar shape.

6. A self-service computer system comprising:

a bracket attached to a substantially vertical surface;

a first module including a computer, a bar code reader coupled to the computer for reading bar codes on item purchased by a customer, a card reader coupled to the computer for reading a customer payment card, and a mount for the computer, bar code reader, and card reader, which attaches to the bracket; and a second module below the first module including a receipt printer coupled to the computer for printing a customer receipt and a housing for the receipt printer.

* * * * *